US009178250B2

(12) United States Patent
Blanc et al.

(10) Patent No.: US 9,178,250 B2
(45) Date of Patent: Nov. 3, 2015

(54) ELECTROLYTE FOR A BATTERY

(71) Applicant: Leclanche' SA, Yverdonles-Bains (CH)

(72) Inventors: Pierre Blanc, Morges (CH); Hilmi Buqa, Oberentfelden (CH); Karl Heinz Pettinger, Garching (DE)

(73) Assignee: Leclanche' SA, Yverdon-les-Bains (CH)

( * ) Notice: Subject to any disclaimer, the term of this patent is extended or adjusted under 35 U.S.C. 154(b) by 0 days.

(21) Appl. No.: 14/088,423

(22) Filed: Nov. 24, 2013

(65) Prior Publication Data

US 2014/0080008 A1   Mar. 20, 2014

Related U.S. Application Data

(63) Continuation-in-part of application No. 13/213,580, filed on Aug. 19, 2011, now abandoned.

(30) Foreign Application Priority Data

Aug. 20, 2010 (GB) ...................................... 8015674

(51) Int. Cl.
H01M 6/16 (2006.01)
H01M 10/0567 (2010.01)
H01M 10/052 (2010.01)
H01M 10/0585 (2010.01)

(52) U.S. Cl.
CPC ........ *H01M 10/0567* (2013.01); *H01M 10/052* (2013.01); *H01M 10/0585* (2013.01); *H01M 2300/0025* (2013.01); *Y02E 60/122* (2013.01); *Y10T 29/49108* (2015.01)

(58) Field of Classification Search
CPC .............................................. H01M 2300/0025
USPC ........................................................... 429/338
See application file for complete search history.

(56) References Cited

U.S. PATENT DOCUMENTS

| 6,960,410 B2 | 11/2005 | Kim et al. |
| 2002/0092155 A1 | 7/2002 | Carlson et al. |
| 2003/0049538 A1 | 3/2003 | Buerger et al. |
| 2007/0257062 A1 | 11/2007 | Kraus et al. |

(Continued)

FOREIGN PATENT DOCUMENTS

| CN | 101667662 | 3/2010 |
| CN | 101771167 | 7/2010 |

(Continued)

OTHER PUBLICATIONS

Wu M. S. et al: "Assesment ofhte wettability ofporous electrodes for lithium-ion batteries", Journal of applied electrochemistry, Springer, Dordrecht, NL.

(Continued)

*Primary Examiner* — Jane Rhee
(74) *Attorney, Agent, or Firm* — 24IP Law Group; Timothy R DeWitt

(57) ABSTRACT

Use of an electrolyte for an electrochemical cell and a method for manufacturing an electrochemical cell comprising such an electrolyte. The electrolyte comprises at least one conductive salt comprising lithium ions, at least one solvent and at least one wetting agent. The electrochemical cell comprises at least one anode, at least one cathode and at least one separator arranged between the at least one anode and the at least one cathode. The electrolyte may be filled between the at least one anode and the at least one cathode.

5 Claims, 4 Drawing Sheets

(56) References Cited

U.S. PATENT DOCUMENTS

| | | |
|---|---|---|
| 2007/0287062 A1 | 12/2007 | Tsukuda |
| 2008/0166632 A1 | 7/2008 | Phillips et al. |
| 2010/0047695 A1 | 2/2010 | Smart et al. |
| 2010/0330425 A1 | 12/2010 | Lopatin et al. |

FOREIGN PATENT DOCUMENTS

| | | |
|---|---|---|
| EP | 1 221 733 A2 | 7/2002 |
| JP | 04465499 | 6/2000 |
| JP | 2002042891 | 2/2002 |
| JP | 2002305023 | 10/2002 |
| JP | 2003092137 | 3/2003 |
| JP | 2003346765 | 12/2003 |
| JP | 2004525495 | 8/2004 |
| JP | 2006108092 | 4/2006 |
| KR | 10-0446659 | 11/2002 |
| WO | 01/37295 AI | 5/2001 |
| WO | 02091497 | 11/2002 |
| WO | 2008002486 A2 | 1/2008 |
| WO | 2009035085 | 3/2009 |
| WO | 2009096602 | 8/2009 |
| WO | 2010004012 | 1/2010 |
| WO | 2010054272 | 5/2010 |
| WO | 2011059458 | 5/2011 |

OTHER PUBLICATIONS

Zhang et al: "A review on the separators of liquid electrolyte Li-ion batteries", Journal of power sources, Elsevier SA, CH.

Zhang et al: "A review on electrolyte additives for lithium-ion batteries", Journal of power sources, Elsevier SA, CH.

Stefan C S et al: "Are ionic liquids based on pyrrolidinium imide able to wet separators and electrodes used for Li-ion batteries?", Journal of power sources, Elsevier SA, CH.

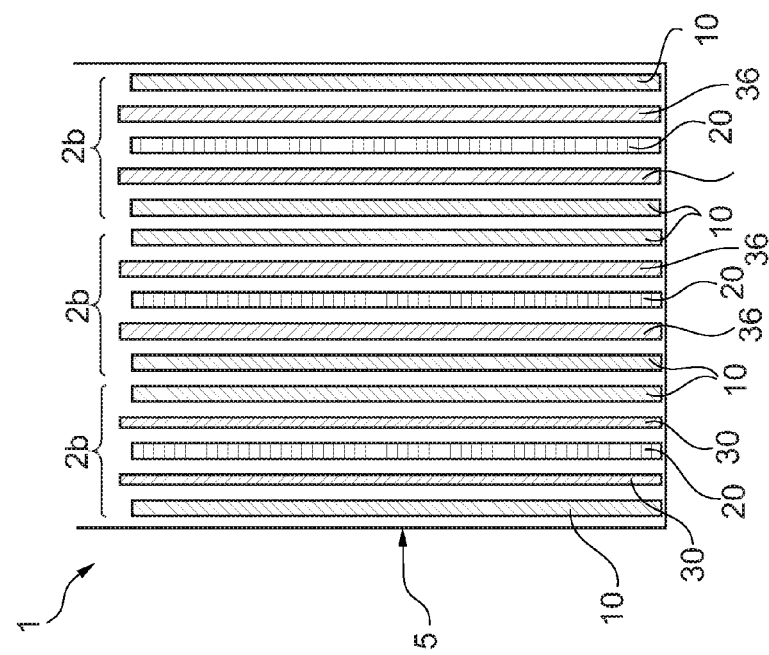
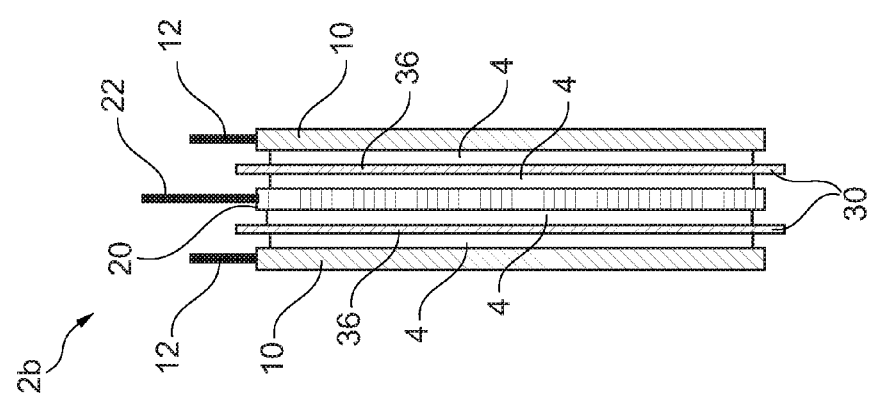

ELECTROLYTE FOR A BATTERY

CROSS-REFERENCE TO RELATED APPLICATIONS

The present application is a continuation-in-part of U.S. patent application Ser. No. 13/213,580 filed by the present inventors on Aug. 19, 2011, which claimed the benefit of UK patent application GB 1013977 in the UK Patent Office.

The aforementioned patent applications are hereby incorporated by reference in their entirety.

BACKGROUND OF THE INVENTION

The present disclosure relates to rechargeable lithium-ion containing electrochemical cells and batteries and to a manufacturing method thereof. In particular, the present disclosure relates to a use of an electrolyte in vacuum filling a large format electrochemical cell and to a method for filling the electrolyte into the electrochemical cell used in rechargeable lithium-ion containing batteries.

Lithium-ion containing rechargeable batteries, also called lithium ion secondary batteries or lithium ion batteries, are advantageous because of their large capacities, their extended life times, the absence of a memory effect and have been widely used for small sized applications. Lithium containing rechargeable batteries are widely used for many applications, and have shown to be particularly useful in mobile phones, mobile computers and other electronic devices.

The use of the lithium-ion containing rechargeable batteries, however, is today limited to smaller cells with limited capacities. Just few large scale lithium cell batteries have been presented on the market so far, although there is an increasing need for large scale and high capacity lithium batteries, for example for the use in electric vehicles or as energy buffers or storages in green energy power plants, such as solar farms or wind farms. Storage of large amounts of electricity is becoming an increasing need for future energy solutions.

However, manufacturing of large format lithium containing batteries has not been possible in a manner that allows cost effective mass production of the large format lithium cells. Present production processes are very time consuming mainly due to the time consuming filling of the electrolyte into the cell and do not allow a cost-effective production of large format lithium containing electrochemical cells or batteries.

WO 02/091497 describes non-ionic surfactants as additives to the electrolyte in lithium ion batteries. These additives are mainly used for improving impedance properties of the battery. The document does not relate to accelerating the filling of electrolyte into an electrochemical cell.

WO 2010/004012 relates to ion-mobility in ionic-liquid electrolytes. This document suggests the use alkyl sulphates as anionic surfactants in the ionic electrolyte liquids to improve cation mobility.

US 2007/0287062 A1 discloses a separator for an electrochemical element. The preparation of electric double layer capacitors is also disclosed. This preparation includes manufacturing electrodes, interposing separators between the positive and the negative electrodes and preparing spiral shaped elements. The spiral shaped elements are then placed into cases made of aluminium. The cases without electrolyte are subjected to vacuum treatment. After cooling to room temperature, the electrolyte is only then injected into an electrolyte injection port of the case. Thus, this document does not disclose filling an electrolyte under vacuum conditions and advantages thereof.

It is an object of the present invention to improve the manufacturing of electrochemical cells.

SUMMARY OF THE INVENTION

The present invention relates to a use of an electrolyte in vacuum filling an electrochemical cell. The electrolyte comprises at least one conductive salt comprising lithium ions, at least one solvent and at least one wetting agent. The electrochemical cell comprises at least one anode, at least one cathode and at least one separator arranged between the at least one anode and the at least one cathode. The electrolyte may be filled between the at least one anode and the at least one cathode.

The invention also relates to a method for manufacturing an electrochemical cell. The method comprises providing at least one anode, at least one cathode and at least one separator between the at least one anode and the at least one cathode, and filling an electrolyte between the anode and the cathode, wherein the electrolyte comprises at least one wetting agent, wherein filling the electrolyte between the anode and the cathode is performed under vacuum conditions.

Using the wetting agent in the electrolyte allows faster filling of the electrochemical cell. Using the wetting agent in the electrolyte enables filling of large format electrochemical cells, even with small distances between the anode and the cathode. The amount of time necessary for filling the electrolyte in the electrochemical cell between the at least one anode and the at least one cathode is considerably reduced. The use of the wetting agent in the electrolyte allows a homogenous distribution of electrolyte between the at least one anode and the at least on cathode, in particular without gas bubbles or other inhomogenities.

A large format electrochemical cell may have at least one dimension of about 100 mm or more. For example, at least one of a cathode, an anode and a separator between the anode and the cathode may have at least one dimension of about 100 mm or more, for example a surface area of about 0.01 $m^2$ or more. The present invention makes the manufacture of much larger electrochemical cells possible.

The at least one anode and the at least one cathode of the electrochemical cell may be arranged at a distance of about 1 mm or less, in particular 0.5 mm or less. The at least one anode and/or the at least one cathode may have a thickness of about 100 μm or less, for example 50 μm or less, thus allowing the manufacture of space and material reduced electrochemical cells with high capacities.

The conductive salt comprising lithium ions may be or may comprise at least one of LiPF6, LiClO4, LiBF4, LiAsF6 and LiPF3(CF2CF3), Lithium bis[1,2-oxalato(2-)-O,O']borate (LiBOB) based electrolytes, Lithium tris(pentafluoroethyl) trifluorophosphate Li[$(C_2F_5)_3PF_3$] short LiFAP, $LiF_4C_2O_4$, LiFOP, $LiPF_4(C_2O_4)$, $LiF_4OP$, $LiCF_3SO_3$, $LiC_4F_9SO_3$, $Li(CF_3SO_2)_2N$, $Li(C_2F_5SO_2)_2N$, LiSCN and $LiSbF_6$, Lithium-trifluormethansulfonat ("Li-Triflat"), Lithiumimide (Lithium-bis(perfluoralkylsulfonyl)-imide) sowie Lithium-methide (Lithium-tris(perfluoralkylsulfonyl) methide), LiIm $(BF_3)_2$, high voltage LiTDI, LiPDI and LiHDI (lithium salts of 2-perfluoroalkylo-4,5-dicyanoimidazole), $LiAlO_4$, $LiAlCl_4$, LiCl and LiI and the like.

The at least one wetting agent may be or may comprise a fluoropolymer. Possible examples for fluoropolymers comprise commercially available perflourinated alkyl ethoxylates such as Zonyl SFO, Zonyl SFN and Zonyl SF300 (E. I.

DuPont). Li-thium-3-[(1H,1H,2H,2H-fluoralkyl)thio]-propionat, Zonyl FSA©, Du Pont). Other fluoropolymers that may be used with the present disclosure comprise semi-fluorinated acryl polymer EGC-1700, Fluoromethacrylate, long-chain perfluoroacrylates, tetrafluorethylene, hexafluoropropylene, silane-coupling agent with perfluoropolyether (PFPE-S), (perfluoroalkyl)ethyl methacrylate-containing acrylic polymers, butyl methacrylate-co-perfluoroalkyl acrylate, semifluorinated fluorocarbon diblock copolymer poly(butyl methacrylate-co-perfluoroalkyl acrylate), n-perfluorononane, perfluoropropyleneoxyde, polytetrafluoroethylene, poly(tetrafluoroethylene-co-hexafluoropropylene), perfluorobutyl (PFB), perfluoromethyl, perfluoroethyl or a combination thereof.

The at least one wetting agent may be or comprise an ionic surfactant, in particular an anionic surfactant, such as a fluorosurfactant. Commercially available examples of fluorosurfactants that may be used with the present disclosure comprise. but are not limited to, fluorosurfactants distributed by DuPont under the product name Zonyl SFK, Zonyl SF-62 or distributed by 3M Company under the product name FLURAD FC 170, FC 123, or L-18699A. Using an non-ionic surfactant has the advantage of excellent wetting, leveling and flow electrolyte control in a variety organic solvents Non-ionic surfactants drastically lowers surface tension and improve electrode wetting in terms of surface tension reduction at exceedingly low concentrations. In a two-phase system, for example, liquid-liquid or solid-liquid, a surfactant tends to locate at the interface of the two phases, where it introduces a degree of continuity between the two different materials.

Other commercially available products that may be used as fluorosurfactant comprise 3M Company products distributed under the product name Novec F-C4300, 3M FC-4430, 3M FC-4432, or 3M FC-4434.

The at least one wetting agent may be provided in the electrolyte at a final concentration of about 5000 ppm (parts per million) or less, in particular in a concentration of about 500 ppm or less to limit foam formation. (At least one wetting agent may be provided in the electrolyte at a final concentration of about 5 ppm or more, in particular of about 50 ppm or more. These concentrations have been found give good results with respect to fast and homogenous filling of the electrolyte into a pre-assembled cell.

The solvent may be a non-aqueous solvent. The non-aqueous solvent may comprise any combination of ionic liquids. The non-aqueous solvent may comprise at least one of a cyclic carbonate, a cyclic ester, a linear carbonate, ether or a combination thereof. The non-aqueous solvent may be an organic solvent comprising at least one solvent selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), methylpropyl carbonate (MPC), fluoroethylene carbonate (FEC), γ-butyrolactone (GBL), methyl formate, ethyl formate, propyl formate, methyl acetate, ethyl acetate, propyl acetate, pentyl acetate, methyl propionate, ethyl propionate, propyl propionate, butyl propionate, 1,2-butylene carbonate, 2,3-butylene carbonate, 1,2-pentylene carbonate and 2,3-pentylene carbonate or a combination thereof.

BRIEF DESCRIPTION OF THE FIGURES

The following description gives examples of embodiments of the present disclosure and is made with respect to the attached Figures in a purely exemplifying and non limiting manner, wherein:

FIG. 2A is a side view of an electrochemical cell of a second preferred embodiment of the present invention.

FIG. 2B shows how electrochemical cells can be stacked to form a battery in accordance with a preferred embodiment of the present invention;

DETAILED DESCRIPTION OF THE PREFERRED EMBODIMENTS

Figure 1B:
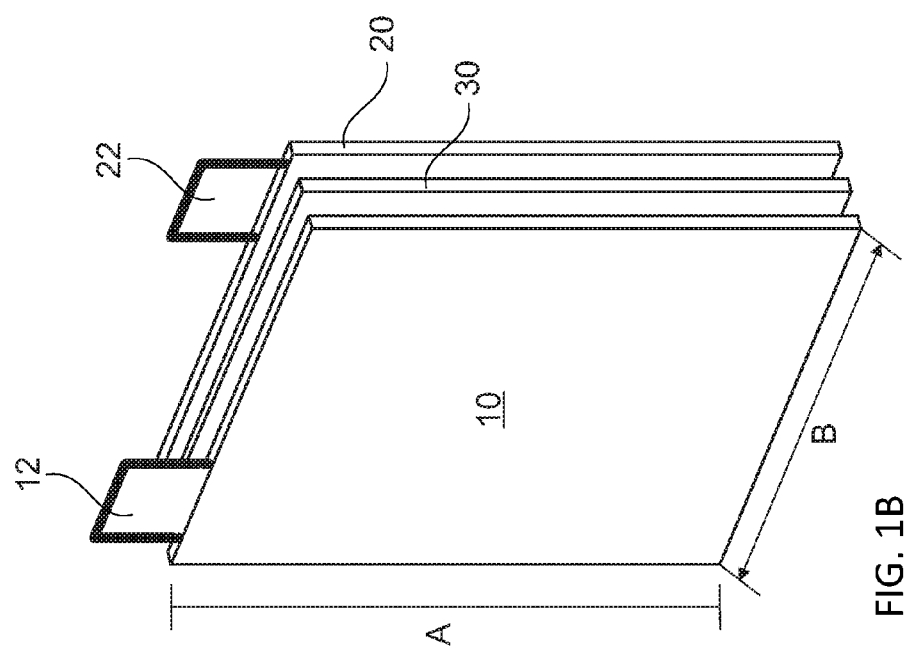
FIG. 1B is a perspective view of an electrochemical cell of a preferred embodiment of the present invention.
Figure 1A:
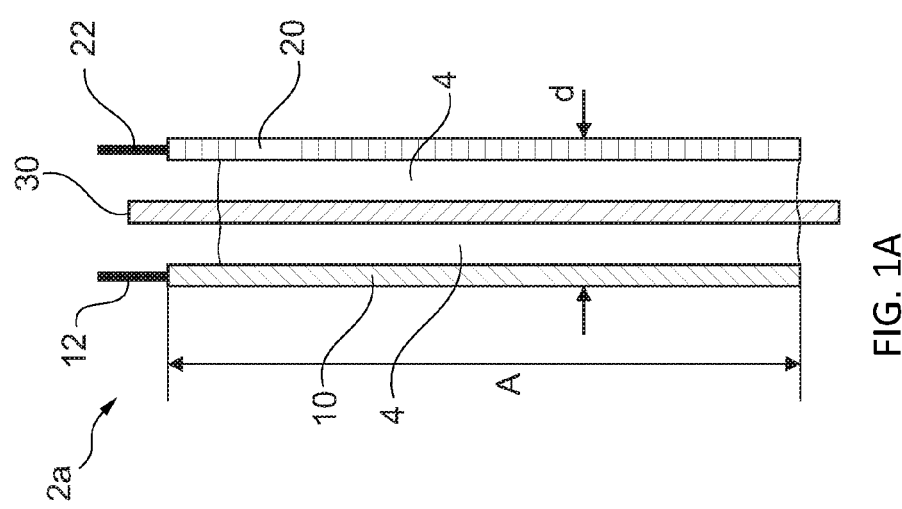
FIG. 1A is a side view of an electrochemical cell of a preferred embodiment of the present invention.

FIGS. 1a and 1b show an example of an electrochemical cell 2 that can be used with the present disclosure. The electrochemical cell 2 comprises two electrodes, an anode 10, and a cathode 20. The anode 10 and the cathode 20 are separated by a separator 30. The anode 10 and the cathode 20 may be made from any material known in the art of electrochemical cells. For example, the anode 10 may comprise a collector and a carbon or graphite coating or lithium titanate oxide or any other lithium metal alloys, but the anode is not limited to such materials. The collector may be made from copper, aluminium, stainless steel, titanium or any other material known in the art. The cathode 20 may comprise a cathode-collector made from aluminium, stainless steel, titanium or any other material known in the art and may comprise a metal oxide layer such as aluminium oxide or other materials known in the art such as lithium cobalt oxide or other metals oxides, but not limited to such materials.

The anode 10 and the cathode 20 have electrical contacts 12, 22 for electrically contacting the respective electrode.

The separator 30 may be a ceramic separator as known in the art. The invention is, however, not limited to the above materials and any electrode or separator material known, such as for example polyolefin-based or polyester-based materials can be used with the present disclosure.

The electrochemical cell 2a may be a large format electrochemical cell. An electrochemical cell may be called a large format electrochemical cell if at least one of the electrodes 10, 20 and the separator 30 between the electrodes have a length A and/or a width B of at least about 10 cm or more. For example the length A and the width B of the electrodes 10, 20 can be about 10 to about 30 cm. The length A may be different than the width B allowing rectangular shapes or any other shape desired. The shape of the electrode may be adapted to the application of the electrochemical cell or battery and may be adapted to a particular casing.

In the shown example, the distance D between the anode 10 and the cathode 20 is less than 1 mm. For example, the distance between an anode collector of the anode 10 and a cathode connector of the cathode 20 may about 400 µm or less.

Each one of the electrodes 10, 20 of the anode 10 and the cathode 20 may be made of a foil material of a thickness of about less than 50 µm. In particular the foils may have a thickness of about 10 to 20 µm. For example, an aluminium foil may be used for the cathode 20 and a copper foil may be used for the anode 10.

The electrochemical cell 2a is filled with an electrolyte 4 that is in contact with the anode 10 and the cathode 20.

FIG. 2a shows an electrochemical cell 2b that differs from the electrochemical cell 2a in that at both sides of the cathode 20 a separator 30 and an anode 10 are arranged. The electrolyte 4 is inserted between each anode 10 and the cathode 20. This allows closer stacking of the electrochemical cells 2b in a battery 1 and requires less cathode material. The electrical contacts 12, 22 are omitted in the figures for clarity reasons.

A plurality of the electrochemical cells 2a as shown in FIGS. 1a and 1b or a plurality of electrochemical cells 2b as shown in FIG. 2a may be stacked on top of each other to form a rechargeable battery 1. FIG. 2b illustrates how a plurality of electrochemical cells 2b can be stacked in a housing, pack or pouch 5. The number of electrochemical cells 2 stacked can be varied according to the application of the rechargeable battery 1. In the example show, three electrochemical cells 2b are shown for illustrative purposes stacked to form a rechargeable battery 2, but the number of electrochemical cells 2a, 2b can be much higher. For example, a battery 2 may comprise up to about 500 electrochemical cells 2a, 2b.

The electrochemical cells 2a as shown in FIGS. 1a and 1b may simply be stacked on top of each other and the electrodes 10, 20 may be separated from each other using a separator material.

Figure 3:
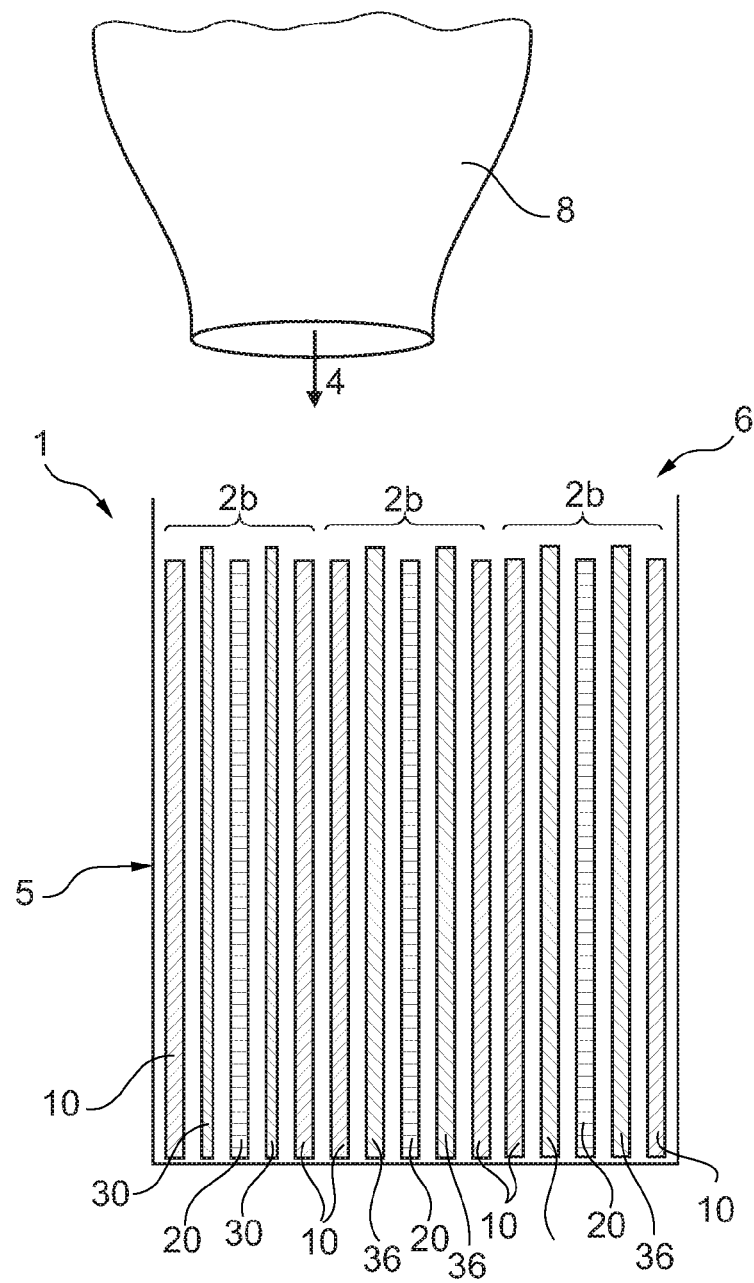
FIG. 3 shows filling a battery comprising a plurality of stacked electrochemical cells with electrolyte in accordance with a preferred embodiment of the present invention.
Figure 4:
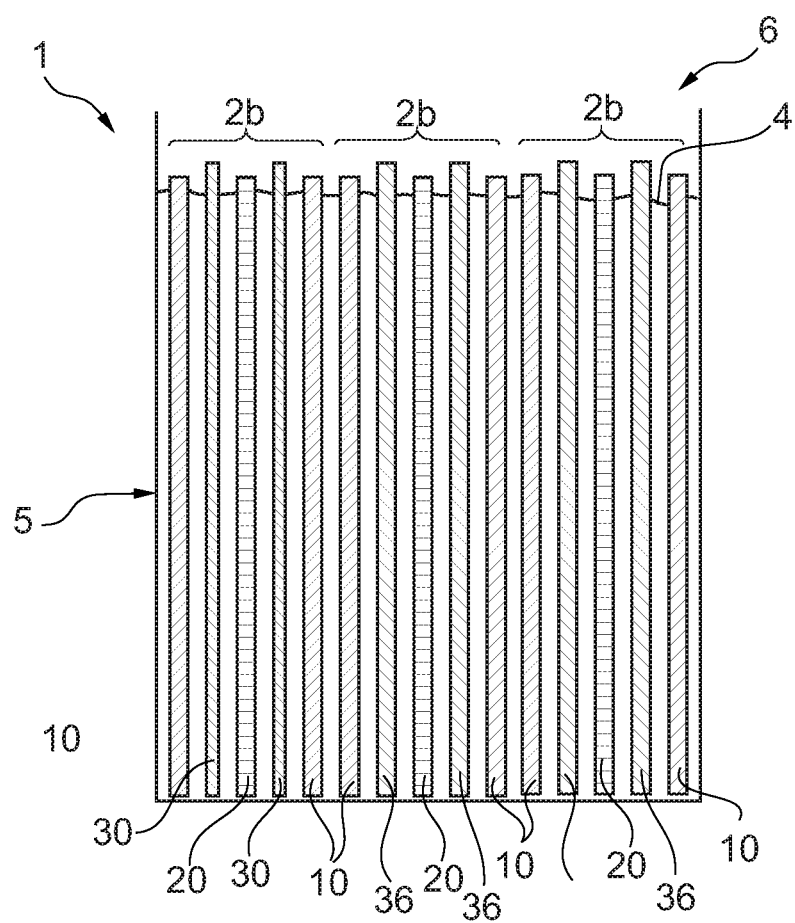
FIG. 4 shows the filled battery in accordance with a preferred embodiment of the present invention.

However, other stacking methods are also possible and applicable with the present invention. FIGS. 2-4 show electrochemical cells 2b in bicell-configuration. The cell can also be implemented in monocell-configuration, bipolar-configuration, as wound or Z-stacked cell. The active masses or active materials can be coated single-sided or double-sided to the collector. Other stacking methods may be applied as well, such as alternating stacking of anodes and cathodes, each with a separator material in between. By doing this, it is possible to use both surfaces of the anode and of the cathode.

FIG. 2b shows a plurality of electrochemical cells 2b stacked in a package or pouch 5 in bicell-configuration, prior to filling electrolyte into the electrochemical cells 2b.

FIG. 3 shows how the electrolyte 4 may be inserted in the electrochemical cells 2a, 2b. The electrochemical cells 2a, 2b may be packed in a pouch 5 that is closed on all sites except the top side 6 using a dosing apparatus 8 such as a needle or the like. FIG. 3 shows a bicell-configuration of three pairs of electrochemical cells 2b, wherein the contacts 12, 22 are omitted for clarity reasons. The dosing apparatus 8 allows inserting an pre-determined amount of electrolyte 4 into the electrochemical cells 2a, 2b. Inserting the electrolyte 4 in the electrochemical cells 2a, 2b packed in the pouch 5 may be performed under vacuum conditions, for example at a pressure of about 10 to 500 mbar abs. The electrolyte 4 may be injected from one side only, substantially simplifying the injection procedure.

It is important to have a very homogenous distribution of electrolyte 4 between the anode 10 and the cathode 20, in particular, no bubbles or other errors shall be present between the anode 10 and the cathode 20, as this will lead to undesired defects and less battery capacities. The electrolyte 4 used in lithium containing batteries 1 may comprise a non-aqueous solvent such as, for example, a cyclic carbonate, a cyclic ester, a linear carbonate, an ether, or a combination thereof. Other organic solvents may be used.

The electrolyte 4 for lithium ion batteries 1 also comprises conductive lithium salts such as for example LiClO4, LiPF6, LiBF4, LiAsF6 and LiPF3(CF2CF3), Lithium bis[1,2-oxalato(2-)O,O']borate (LiBOB) based electrolytes, $LiF_4C_2O_4$, LiFOP, $LiPF_4(C_2O_4)$, $LiF_4OP$, $LiCF_3SO_3$, $LiC_4F_9SO_3$, $Li(CF_3SO_2)_2N$, $Li(C_2F_5SO_2)_2N$, LiSCN and $LiSbF_6$, $LiAlO_4$, $LiAlCl_4$, LiCl and LiI or a combination thereof. Other known lithium salts may be used as well. The salt concentration on the non-aqueous electrolyte may be in the range of about 0.5 to 2.0 mol/L The electrolyte 4 comprises a wetting agent. The wetting agent is used to homogenously wet the surfaces of the anodes 10, the cathodes 20 and the separator 30 and to obtain a homogeneous distribution of electrolyte 4 inside the electrochemical cells 2a, 2b. The wetting agent also serves for a fast filling of the cell.

The wetting agent also enables a one-way filling from one side. A single filling step is sufficient to wet the entire surfaces of the separator and the electrodes even in large format electrochemical cells having a length A and/or a width B of at least about 10 cm or more.

State of the art cells are usually tempered at temperatures of about 50 to 60° C. for more than 12 hours. It has been found that the tempering times can be reduced to less than about 6 hours if the wetting agent is applied.

The wetting agent may be or may comprise a fluoropolymer, in particular a fluorosurfactant. Possible examples for fluoropolymers comprise commercially available perflourinated alkyl ethoxylates such as Zonyl SFO, Zonyl SFN and Zonyl SF300 (E. I. DuPont). Li-thium-3-[(1H,1H,2H,2H-fluoralkyl)thio]-propionat, Zonyl FSA©, DuPont).

Commercially available examples of fluorosurfactants that may be used with the present disclosure comprise but are not limited to fluorosurfactants distributed by DuPont under the product name Zonyl SFK, Zonyl SF-62 or distributed by 3M Company under the product name FLURAD FC 170, FC 123, or L-18699A. Other commercially available product that may be used as fluorosurfactant comprise 3M Company products distributed under the product name Novec F-C4300, 3M FC-4430, 3M FC-4432, or 3M FC-4434.

Other wetting agents that may be used with the present disclosure comprise semi-fluorinated acryl polymer EGC-1700, Fluoromethacrylate, long-chain perfluoroacrylates, tetrafluorethylene, hexafluoropropylene, silane-coupling agent with perfluoropolyether (PFPE-S), (perfluoroalkyl) ethyl methacrylate-containing acrylic polymers, butyl methacrylate-co-perfluoroalkyl acrylate, semifluorinated fluorocarbon diblock copolymer poly(butyl methacrylate-co-perfluoroalkyl acrylate), n-perfluorononane, perfluoropropyleneoxyde, polytetrafluoroethylene, poly(tetrafluoroethylene-co-hexafluoropropylene), perfluorobutyl (PFB), perfluoromethyl, perfluoroethyl or a combination thereof.

One or more of the above wetting agents may be used alone or in combination. A combination of non-ionic and anionic fluorosurfactants may be applied or non-ionic fluorosurfactant can be used alone.

The wetting agents, fluoropolymers or fluorosurfactants may be used at a concentration of about 5 ppm (parts per million) to about 5000 ppm. These concentrations have been found to give good results with respect to fast and homogenous filling of the electrolyte into a pre-assembled cell. It has been found that a concentration of the wetting agent of more than 0.05% wt electrolyte increases foam formation which reduces wettability.

The use of the wetting agent in the electrolyte results in an even and homogeneous distribution of the electrolyte 4 in the electrochemical cell 2a, 2b. The use of the wetting agent allows reducing the filling times considerably and allows to manufacture large format lithium ion batteries in acceptable time scales suitable for mass production.

FIG. 4 shows a sealed battery pack 1, wherein the opening 6 of the pouch 5 has been closed after filling the battery pack 1 with electrolyte 4 has been completed.

It is obvious to a person skilled in the art that other possibilities than pouches 5 exist to pack the electrochemical cells 2a, 2b. For example, a battery housing from known plastics materials may be used.

It is obvious to a person skilled in the art that a plurality of battery packs 1 may combined to increase the capacity and/or voltage of the battery.

The electrolyte of the present disclosure may be used with any type of electrochemical cells and a person skilled in the art may adapt the properties of the electrolyte to different applications, i.e. to the size and material of the electrochemical cells used.

What is claimed is:

1. A method for manufacturing a large format electrochemical cell, the method comprising the steps of:
    providing at least one anode, at least one cathode and at least one separator between the at least one anode and the at least one cathode, wherein the at least one cathode, the at least one anode and the at least one separator have at least one dimension of about 100 mm or more; and
    filling an electrolyte between the anode and the cathode in a single filling step, wherein the electrolyte comprises at least one wetting agent, wherein filling the electrolyte between the anode and the cathode is performed under vacuum conditions at a pressure of about 10 to 500 mbar abs and wherein the at least one wetting agent comprises a fluoropolymer or a non-ionic surfactant.

2. The method of claim 1, wherein the step of filling the electrolyte between the anode and the cathode comprises injecting the electrolyte from one side of the at least one anode, the at least one cathode and the at least one separator.

3. The method of claim 2, further comprising placing the at least one anode, the at least one cathode and the at least one separator in a pouch with one open side and wherein injecting the electrolyte comprises injection the electrolyte through the open side of the pouch.

4. The method of claim 1, wherein the providing the at least one anode, the at least one cathode and the at least one separator comprise laminating the at least one anode, the at least one cathode and the at least one separator to each other.

5. The method of claim 1, wherein the electrolyte comprises:
    at least one conductive salt comprising lithium ions,
    at least one solvent and
    at least one wetting agent.

* * * * *